United States Patent
Court et al.

(10) Patent No.: US 8,368,275 B2
(45) Date of Patent: Feb. 5, 2013

(54) ELECTRIC MOTOR WINDINGS

(75) Inventors: Andrew Lee Court, Coventry (GB); Jeffrey Ronald Coles, Solihull (GB)

(73) Assignee: TRW Limited, West Midlands (GB)

( * ) Notice: Subject to any disclaimer, the term of this patent is extended or adjusted under 35 U.S.C. 154(b) by 668 days.

(21) Appl. No.: 12/302,172

(22) PCT Filed: May 4, 2007

(86) PCT No.: PCT/GB2007/001639
§ 371 (c)(1),
(2), (4) Date: Feb. 9, 2010

(87) PCT Pub. No.: WO2007/129061
PCT Pub. Date: Nov. 15, 2007

(65) Prior Publication Data
US 2010/0127591 A1 May 27, 2010

(30) Foreign Application Priority Data
May 6, 2006 (GB) .................................. 0609045.0

(51) Int. Cl.
H02K 3/04 (2006.01)
H02K 1/00 (2006.01)
H02K 3/00 (2006.01)
H02K 17/00 (2006.01)
(52) U.S. Cl. ........ 310/179; 310/189; 310/205; 310/200; 310/203; 310/208; 29/596; 29/605
(58) Field of Classification Search .................. 310/179, 310/189, 200, 208, 203, 205; 29/596, 605
See application file for complete search history.

(56) References Cited

U.S. PATENT DOCUMENTS

| | | | |
|---|---|---|---|
| 6,265,804 B1 * | 7/2001 | Nitta et al. | 310/216.066 |
| 6,323,574 B1 * | 11/2001 | Takura | 310/179 |
| 6,983,528 B1 | 1/2006 | Muller et al. | |
| 7,262,538 B2 * | 8/2007 | Yoneda et al. | 310/179 |
| 7,560,835 B2 * | 7/2009 | Groening et al. | 310/12.22 |
| 2002/0011755 A1 | 1/2002 | Shteynberg | |
| 2003/0231697 A1 * | 12/2003 | Fortner et al. | 374/179 |
| 2005/0242677 A1 * | 11/2005 | Akutsu et al. | 310/179 |
| 2006/0267436 A1 * | 11/2006 | Naito et al. | 310/156.32 |
| 2007/0040467 A1 * | 2/2007 | Gu | 310/216 |

FOREIGN PATENT DOCUMENTS
DE 19740937 A1 3/1999
(Continued)

OTHER PUBLICATIONS

Machine translation of JP2002064962, Masaki, Feb. 2002.*
Machine translation of JP 2000188839, Fukutani, Jul. 2000.*
(Continued)

*Primary Examiner* — Quyen Leung
*Assistant Examiner* — Terrance Kenerly
(74) *Attorney, Agent, or Firm* — MacMillan, Sobanski & Todd, LLC

(57) ABSTRACT

A stator for a multi-phase electric motor comprises a plurality of teeth for each phase. The windings on two teeth from one phase are formed from a single length of conductor. The windings on a first one of the teeth being formed at least in part from two sections of the conductor spaced apart along the length of the conductor, and the windings on a second one of the teeth being formed from an intermediate section of the conductor between the spaced apart sections.

14 Claims, 4 Drawing Sheets

FOREIGN PATENT DOCUMENTS

| | | | |
|---|---|---|---|
| EP | 0064105 | A1 | 11/1982 |
| JP | 2000188839 | A | 7/2000 |
| JP | 2002064962 | * | 2/2002 |
| JP | 2002064962 | A | 2/2002 |
| WO | 9202982 | A1 | 2/1992 |

OTHER PUBLICATIONS

International Search Report from WO 2007129061 dated Aug. 24, 2007.

Great Britain Search Report for GB0609045.0 dated Sep. 4, 2006.

* cited by examiner

ELECTRIC MOTOR WINDINGS

CROSS-REFERENCE TO RELATED APPLICATIONS

This application claims priority to International Patent Application No. PCT/GB2007/001639 filed May 4, 2007, the disclosures of which are incorporated herein by reference in entirety, and which claimed priority to Great Britain Patent Application No. 0609045.0 filed May 6, 2006, the disclosures of which are incorporated herein by reference in entirety.

BACKGROUND OF THE INVENTION

The present invention relates to electric motors and in particular to the windings of stators in electric motors.

In many forms of electric motor the stator has a number of phases each of which is made up of a number of teeth. Each tooth has a length of conductor wound round it for a number of turns, and the windings on the teeth making up any one of the phases are connected together electrically so that the magnetic fields generated in all of the teeth of the phase are controlled together.

There are a number of ways of forming the windings in such a motor. Some methods result in balanced windings, in which the number of turns is the same for each tooth. Other methods result in unbalanced windings, in which there are different numbers of windings on different teeth.

There are a number of factors which determine the most appropriate winding method for any motor, and these include whether balanced windings are required, packaging limitations due to the small amount of space into which the motor generally needs to fit, and ease of manufacture.

BRIEF SUMMARY OF THE INVENTION

The present invention provides a stator for a multi-phase electric motor comprising a plurality of teeth for each phase, wherein the windings on two teeth from one phase are formed from a single length of conductor, the windings on a first one of the teeth being formed at least in part from two sections of the conductor spaced apart along the length of the conductor, and the windings on a second one of the teeth being formed from an intermediate section of the conductor between the spaced apart sections.

The present invention further provides a method of winding a stator for a multi phase electric motor, the stator comprising a plurality of teeth for each phase, the method comprising forming the windings on two teeth of one phase from a single length of conductor, wherein the windings on a first one of the teeth are formed at least in part from two sections of the conductor spaced apart along the length of the conductor, and the windings on a second one of the teeth are formed from an intermediate section of the conductor between the spaced apart sections.

Other advantages of this invention will become apparent to those skilled in the art from the following detailed description of the preferred embodiments, when read in light of the accompanying drawings.

DETAILED DESCRIPTION OF THE INVENTION

Figure 1:
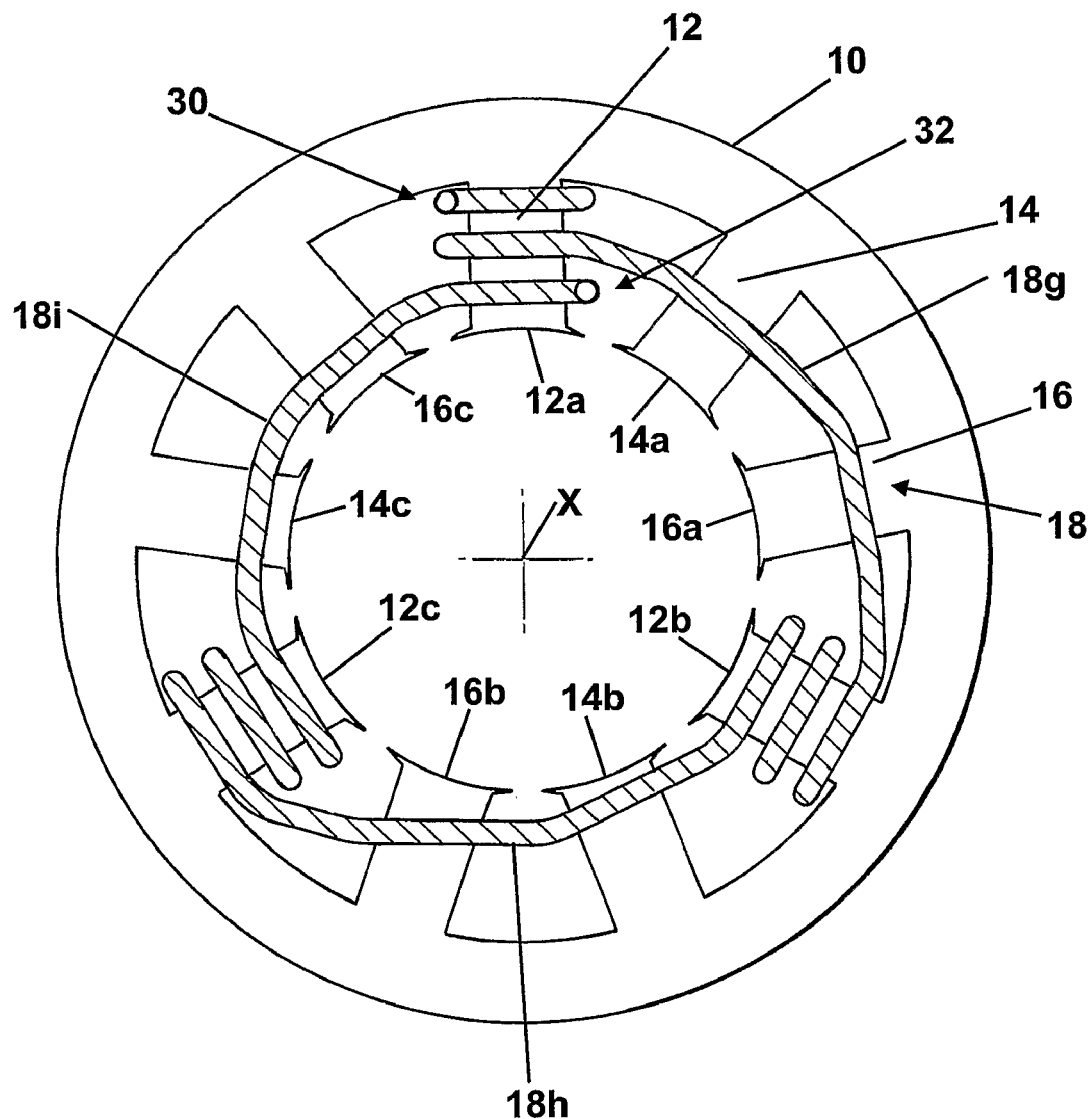
FIG. 1 is a bottom view of a stator of a motor according to a first embodiment of the invention.

Referring to FIG. 1 an electric motor, which in this case is a synchronous, three phase, sinusoidal AC, permanent magnet, brushless motor for a power steering system, includes a stator 10 having nine teeth 12, 14, 16 three for each phase. The three teeth of each phase are equally spaced around the stator axis at 120° intervals. The rotor is a fully round design with all of the teeth fixed in position relative to each other. Although the other parts of the motor are not shown in the figures, the top of the stator as seen in the figures corresponds to the top end as installed, which will therefore be at an open end of the motor housing. The bottom of the stator as seen in the figures corresponds to the bottom end as installed and will generally be at the closed bottom end of the motor housing.

Figure 2:
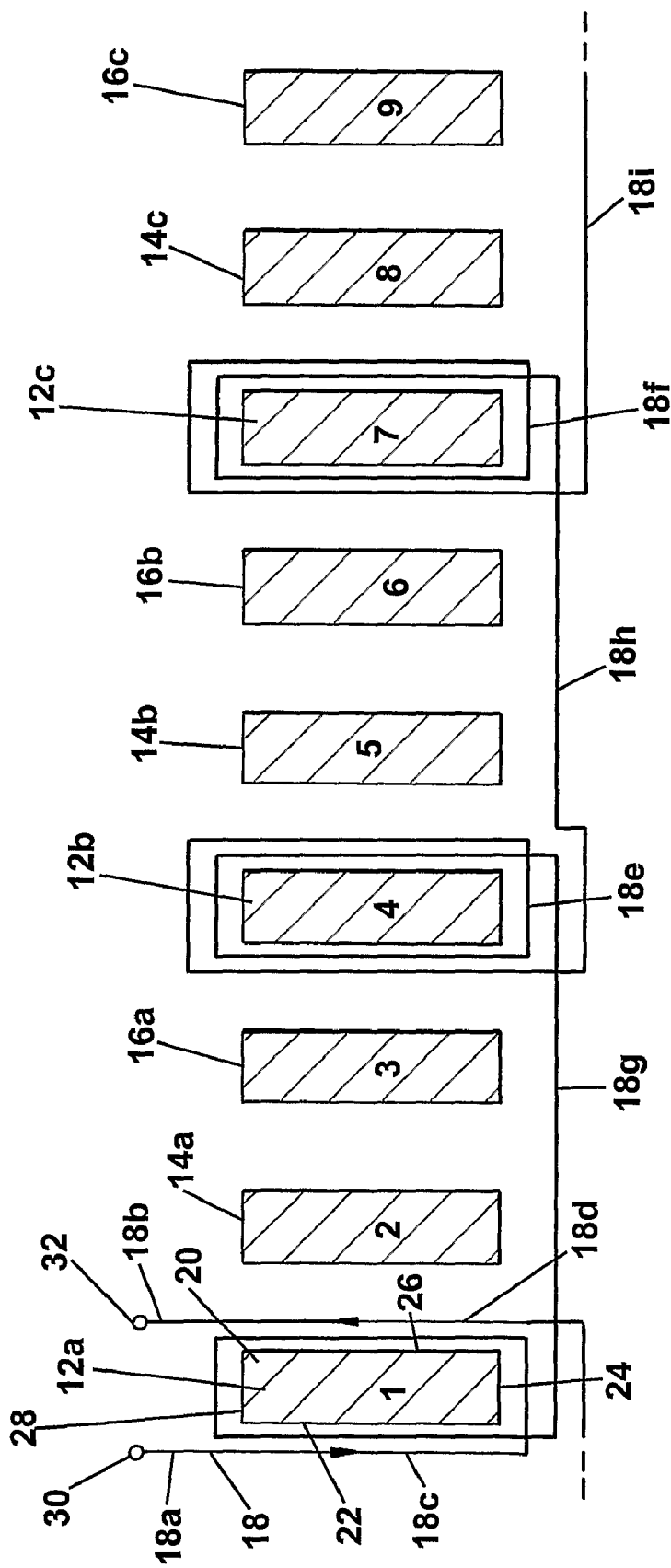
FIG. 2 is a schematic representation of the winding arrangement of the stator of FIG. 1.

Referring to FIG. 2, the method of winding one of the phases 12 will now be described. As the rotor is of a one-piece fully round design the winding is carried out with the teeth in their final relative positions. Appropriate automated tools for carrying out this winding are known and it will be appreciated that the skilled man can modify these to carry out this winding method. To produce a winding having n turns on each tooth, during winding of the first phase 12, a single length of conductor 18 is used to wind all of the teeth 12a, 12b, 12c of that phase. The winding starts from the top end 20 of the first tooth 12a and the conductor is passed down one side 22 of the first tooth 12a. It is then passed right around the first tooth for a number n−1 of complete turns, one less than the final required number n of turns per tooth, each turn passing under the bottom end 24, up the second side 26, across the top 28, and back down the first side 22 of the first tooth 12a. It is then passed beneath the bottom ends of the first tooth 12a, and the next two teeth 14a, 16a which are in the second and third phases, before being passed through a number of complete turns round the second tooth 12b of the first phase. Each of these turns starts and ends at the bottom of the tooth 12b. The conductor 18 is then passed under the second tooth 12b of the first phase and on under the second teeth 14b, 16b of each of the second and third phases, before being passed through a number of complete turns around the third tooth 12c of the first phase. Finally the conductor 18 is passed under the bottom of the third tooth 12c of the first phase, and under the third teeth 14c, 16c of the second and third phases back to the first tooth 12a of the first phase, where it is passed under the first tooth 12a, and up the second side 26 of the first tooth. The conductor therefore extends, in a loop, completely around the stator axis, with the windings round the respective teeth spaced around the loop as the teeth are spaced around the stator 10.

The two ends 18a, 18b of the conductor are connected to respective connectors 30, 32 which are located near to, and in this case above, the top of the stator 10. Since both ends 18a, 18b of the conductor 18 are close to the same tooth 12a, the two connectors 30, 32 are close together. This simplifies the design of the lead frame that provides electrical power to the winding. As can be seen from FIG. 2, a set of adjacent teeth, 12a, 14a, 16a, one from each phase, can be used as the starting and ending point for the windings for the phases, so that the connectors for all of the phases are adjacent to that group of adjacent teeth. Again, this helps to simplify the design of the lead frame which provides power to the windings.

It will also be appreciated that the winding arrangement of this embodiment has a number of advantageous features. Each tooth except the first one 12a has the same number n of complete turns of conductor around it. The conductor extends down each side of each tooth, including the first, the same number of times n. The conductor 18 extends under each tooth of the first phase the same number times n+1. If the position of the connectors 30, 32 is modified, the conductor can be arranged to pass one more time over the top end 20 of the first tooth, so that each tooth, including the first, has the same number n of complete turns of conductor around it. This arrangement therefore allows for a balanced winding. This is achieved because the sections 18c, 18d of the conductor 18 adjacent to the ends 18a, 18b of the conductor extend along opposite sides of the same tooth 12a, with the windings round the other teeth 12b, 12c of the phase being formed from intermediate sections 18e, 18f of the conductor. Also all of the interconnecting sections 18g, 18h, 18i of the conductor that extend between the teeth 12a, 12b, 12c of the phase extend under the bottom end of the rotor 10, below any intervening teeth, which is advantageous from a packaging point of view as there is generally little room at the top end of the rotor.

A number of modifications can be made to the embodiment of FIGS. 1 and 2. For example, the number of phases and the number of teeth per phase can clearly vary. Also, whereas in this example all of the teeth in each phase are wound from a single conductor, it is also possible where there are higher numbers of teeth per phase, to wind each phase as two separate groups of teeth, each group being wound with a single length of conductor. Furthermore, while in this embodiment the teeth are wound in the order in which they are located around the stator, which is clearly simple and convenient, there is no need for this always to be the case, and the winding could proceed in any suitable order.

Figure 3:
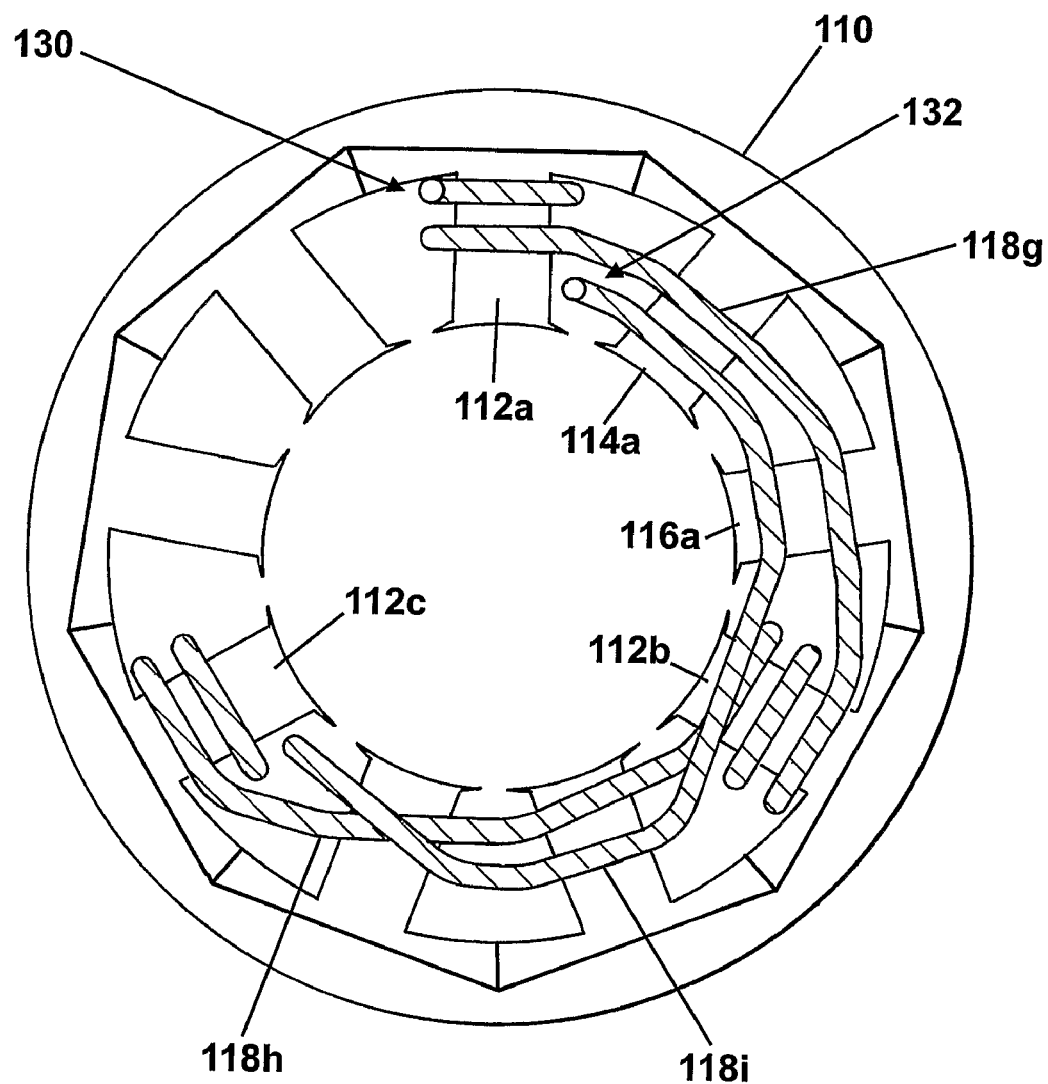
FIG. 3 is a bottom view of a stator of a motor according to a second embodiment of the invention.
Figure 4:
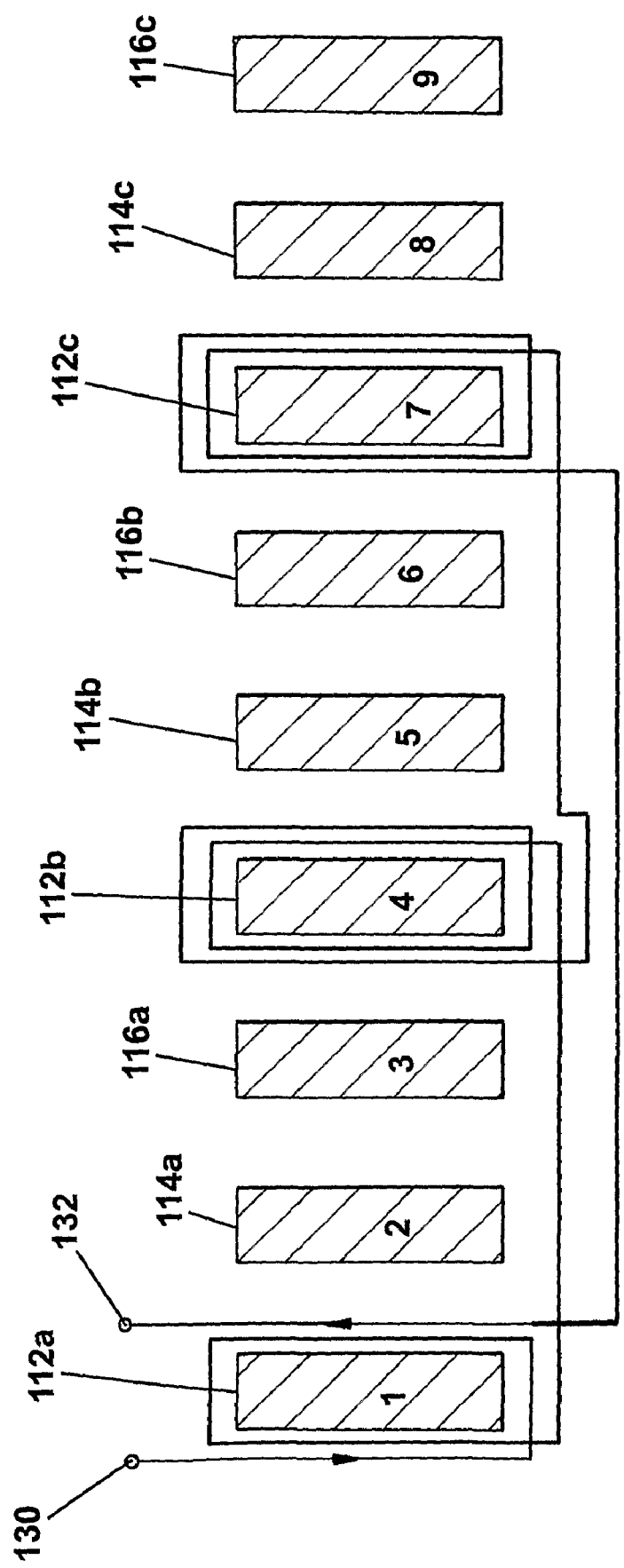
FIG. 4 is a schematic representation of the winding arrangement of the stator of FIG. 3.

Because, in the embodiment of the FIG. 1, the conductor extends in a loop around the stator axis, the conductor has to be wound onto the stator in situ, i.e. with the teeth in the final position relative to each other. However, referring to FIGS. 3 and 4, in a second embodiment the stator 110 is segmented, with the teeth 112a, 112b, 112c of the first phase and the teeth of the other two phases formed separately so that they can be inserted into the stator 110 separately or in groups. This allows the teeth making up each phase to be wound with a single length of conductor 118 to form a pre-wound group of teeth before they are inserted into the stator 110. Many of the features of the second embodiment are the same as those of the first, and corresponding parts are indicated by corresponding reference numerals increased by 100.

In order to allow installation of the pre-wound groups of teeth, the closed loop arrangement of the first embodiment needs to be avoided. This is done by, during the winding, passing the conductor 118 from a first tooth 112a in the phase in one direction to a last tooth 112c in that phase, passing all other teeth in that phase in between, and then passing the conductor back in the opposite direction from the last tooth 112c to the first. Obviously the windings round each tooth 112a, 112b, 112c need to be completed during this winding process. In this example, the winding of the three teeth 112a, 112b, 112c is carried out in the same order as the first embodiment, except that between winding the third tooth 112c and the last half winding of the first tooth 112a, the conductor is passed back under the second tooth.

The teeth 112a, 112b, 112c can be wound while mounted on a jig which gives easy access to the teeth for the winding. For example the teeth may be mounted on the jig so that the ends which will be their inner ends in the assembled stator, face outwards away from each other. This can allow precision winding in which the position of each turn of the winding is carefully controlled so as to be in a specific predetermined position on the tooth. The teeth 112a, 112b, 112c with the conductor 118 are then inserted into the rotor 110, and the ends of the conductor 118 connected to connectors 130, 132. For the first phase winding, this leaves one tooth of each of the other phases that the conductor 118 does not pass. The teeth of each of the other two phases can be pre-wound into respective sub-assemblies, which can then be assembled into the stator 110 separately. Since all of the interconnecting sections 118g, 118h, 118i of the conductor extend between the bottom ends of the respective teeth, when the second and third phases are installed these interconnecting sections can be simply inserted below the teeth of the previously installed phases.

When the windings have all been inserted, the two ends 118a, 118b of each conductor are connected to respective connectors 130, 132, in the same manner as in the first embodiment.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A stator for a multi-phase electric motor, the stator comprising a plurality of teeth for each phase of the motor and windings on the teeth, wherein the windings on two of the teeth at one of the phases are formed from a single length of conductor, the windings on a first one of the two teeth being formed at least in part from two sections of the conductor spaced apart along the length of the conductor, and the windings on a second one of the two teeth being formed from an intermediate section of the conductor between the spaced apart sections, and the conductor extending down each side of the first and second teeth the same number of times, wherein the stator has a top end, and the conductor has first and second ends each of which are located at the top end of the stator, and the two sections are towards the first and second ends respectively and extend down opposite sides of the first tooth.

2. A stator according to claim 1 wherein the stator has a bottom end, and the conductor includes an interconnecting section extending between the two teeth, the interconnecting section being at a bottom end of the stator.

3. A stator according to claim 2 wherein the stator has an axis, and the conductor includes a plurality of interconnecting sections between the teeth of the one phase, the interconnecting sections extending around different parts of the stator so that the conductor forms a loop around the stator axis.

4. A stator according to claim 2 wherein the stator has an axis, and the conductor extends only part of the way around the stator axis.

5. A stator according to claim 1 wherein the conductor extends under each of the teeth the same number times.

6. A motor including a stator according to claim 1.

7. A method of winding a stator for a multi phase electric motor, the stator comprising a plurality of teeth for each phase, the method comprising forming the windings on two of the teeth of one of the phases from a single length of conductor, wherein the windings on a first one of the teeth are formed at least in part from two sections of the conductor spaced apart along the length of the conductor, the windings on a second one of the teeth are formed from an intermediate section of the conductor between the spaced apart sections, each of the teeth has two sides and the windings are formed such that the conductor extends down each side of each of the teeth the same number of times, the stator has a top end, and the conductor is wound such that the conductor has first and second ends of which are located at the top end of the stator, and the two sections are towards the first and second ends respectively and are wound such that the two sections extend down opposite sides of the first tooth.

8. A method according to claim 7 including winding the conductor onto each of the teeth such that the conductor includes an interconnecting section extending between the two teeth, the interconnecting section being at a bottom end of the stator.

9. A method according to claim 8 including winding the conductor onto the teeth of the one phase such that the conductor includes a plurality of interconnecting sections between the teeth of the one phase, and so that the interconnecting sections extend around different parts of the stator so that the conductor forms a loop around the stator axis.

10. A method according to claim 9 wherein the conductor is wound onto the teeth while the teeth are located in their final position in the stator.

11. A method according to claim 7 wherein the teeth and conductor are installed into the stator such that the conductor extends only part of the way around the stator axis.

12. A method according to claim 11 wherein the teeth are mounted in a first position relative to each other, the conductor is then wound onto the teeth, and the teeth are then moved into a different position relative to each other for installing into the stator.

13. A stator according to claim 7 wherein the windings are formed such that the conductor extends under each of the teeth the same number times.

14. A motor including a stator wound according to the method of claim 7.

* * * * *